Aug. 29, 1950     T. J. SMULSKI     2,520,899
ELECTRICAL INSTRUMENT
Original Filed Aug. 13, 1942
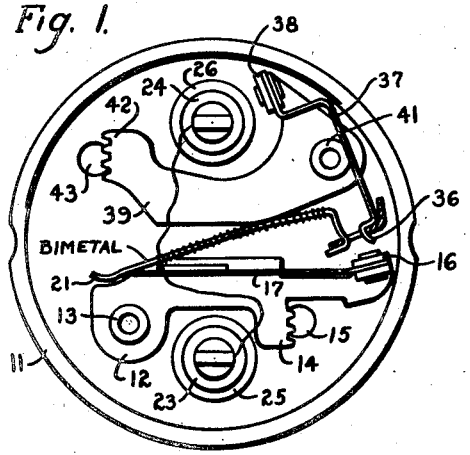
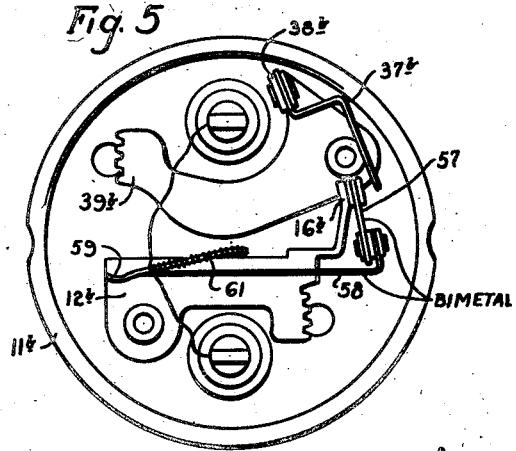
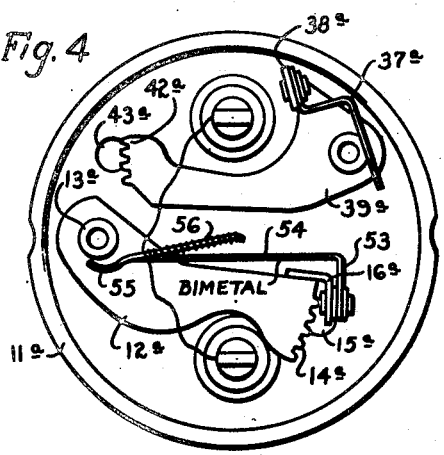
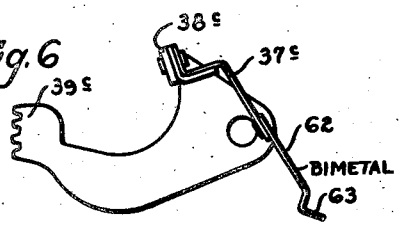
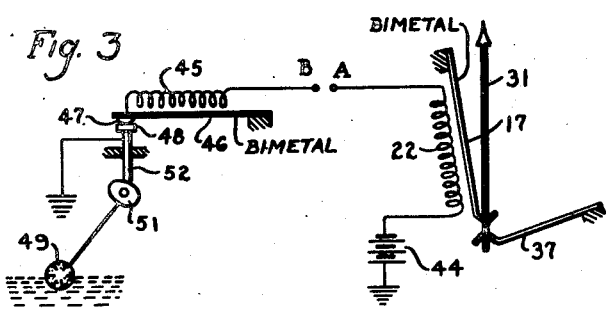
INVENTOR.
Theodore J. Smulski
BY
Charles S. Penfold
ATTORNEY Patented Aug. 29, 1950

2,520,899

UNITED STATES PATENT OFFICE 2,520,899

ELECTRICAL INSTRUMENT

Theodore J. Smulski, Gary, Ind., assignor to Productive Inventions, Inc., a corporation of Indiana Original application August 13, 1942, Serial No. 454,674. Divided and this application April 22, 1946, Serial No. 663,814

11 Claims. (Cl. 171—95)

My invention relates to electrical instruments and more particularly to electrical indicating instruments having a heated bimetallic actuating member.

This application is a division of my abandoned application, Serial No. 454,674, filed August 13, 1942.

My invention is particularly adapted for use in a remote indicating system having a sending instrument provided with bimetallic means which control the transmission of power in accordance with a variable factor to be indicated, and a bimetallic actuated indicating instrument energized by the power so transmitted. Heretofore the instruments used in such systems have been compensated for ambient temperatures so that the accuracy thereof has been satisfactory where there was no great difference between the ambient temperature at the sending or transmitting instrument and the ambient temperature at the receiving or indicating instrument. When such indicating systems and instruments are used under certain conditions where the ambient temperatures at the transmitting and receiving stations are different, certain factors are encountered for which correction or compensation must be made. For example, if a remote indicating systems of the type mentioned is used on aircraft, the ambient temperature at the transmitter may be low due to the high altitude, and the temperature at the receiving instrument may be relatively high due to the fact that the receiving instrument is mounted in a heated cabin.

When the sending and receiving instruments have bimetallic elements of like construction, have like heating elements therefor, and convert electricity to heat at equal rates, the dissipation of heat by radiation at the two instruments will be substantially the same if the ambient temperatures are the same. If, however, there is considerable difference in the ambient temperatures between the two instruments so that the ambient temperature at the receiving instrument is higher, the loss of heat at the receiving instrument is at a rate much greater than the loss of heat at the transmitting instrument. This change in the rate of heat loss must be taken into consideration in order to provide accurate indication.

In certain instances it has been proposed to utilize an indicating instrument having bimetallic actuating means to indicate the electrical condition of the electrical system of a craft and in such case the heat loss must be taken into consideration in order to provide accurate indication. In accordance with my invention these corrections are accomplished by providing some means whereby at the higher ambient temperatures the bimetallic actuating member of the receiving instrument may provide an indication by multiplying the effective deflection of the actuating member by a compensating factor or by decreasing the effort required to produce the indication.

In a remote temperature indicator of the wattage integrator type, the electrical energy converted to heat at the receiver is a function of the temperature of the sender environment. The ambient temperature of the receiver will affect the influence of a given sender temperature upon the receiver unless compensation is provided, because a larger proportion of the electrical energy converted to heat at the receiver will be lost through radiation at high ambient temperature of the receiver than at low ambient temperature thereof.

It is an object of my invention to provide an improved indicating system and apparatus which will be simple to manufacture but which will overcome the above-mentioned disadvantages.

Another object of my invention is to provide an improved indicating instrument in which the bimetallic actuating member is required to act against less physical resistance at the higher ambient temperatures.

Still another object of my invention is to provide an improved indicating instrument in which the action of the bimetallic member is automatically multiplied by a factor which changes with the ambient temperature thereby to provide accurate indication.

Other and further objects of my invention will become more readily apparent by reference to the following specification taken in connection with the accompanying drawing wherein:

Figure 1 is a top view of the essential elements of an indicating instrument constructed in accordance with the present invention;

Figure 2 is a perspective view of certain of the elements of the indicating instrument so as to illustrate more clearly certain constructional features thereof;

Figure 3 is a diagrammatic view explanatory of the circuit arrangements in which an instrument of this type is commonly used;

Figures 4 and 5 are alternative constructional arrangements made in accordance with the present invention; and Figures 6 and 7 show how certain elements of the indicating instruments may be modified in accordance with the present invention.

Referring more particularly to Figures 1 and 2 of the drawing, there is shown a cup-shaped housing and base member 11 within which are supported certain operating elements of the indicating instrument. A suitable dial may be supported by the rim or flange of the cup-shaped housing so that an indicating hand projecting through a suitable opening in the dial will provide the desired indication. The base of the housing 11 has pivotally mounted thereon an arm 12 provided with a perforation through which a headed pin or rivet 13 extends so that the arm 12 is pivotally mounted and frictionally secured in position on the base 11. The arm 12 is provided with a gear sector portion 14 located at a distance from the pivot stud 13 and positioned adjacent an aperture 15 in the base 11. By inserting a geared tool from the bottom of the housing 11 into the opening 15 the gear sector portion 14 of the arm 12 may be engaged so that by rotation of the tool, the arm 12 may be moved to a predetermined position at the time when the instrument is being initially adjusted. Adjacent the outermost end of the arm 12, there is an upstanding portion 16 to which there is secured a bimetallic member 17, best seen in the perspective showing in Figure 2. The bimetallic member 17 is formed so as to be of a generally U-shaped configuration having an ambient temperature compensating leg 18, a heated leg 19 and an interconnecting portion 21. The heated leg 19 is provided with an electrical heating element 22 which is connected between a pair of conductor studs 23 and 24, each of which is secured in the base 11 by suitable insulating washers 25 and 26. In order to determine what portion of the ambient temperature compensating leg 18 is to be effective for this compensation, a portion of this leg may be turned at right angles thereto as at 27 thus rendering that portion of the leg ineffective. In order to prevent the interconnecting portion 21 from having any movement or action it has been found preferable to provide a curved corrugated configuration for the interconnecting portion. Adjacent the end of the bimetallic leg 19 there is a transverse bimetallic portion 28 which terminates in a hook portion 29. The transverse portion 28 introduces a compensating factor for correcting for the increase in the heat loss which occurs for a given rate of electrical heating with rise of ambient temperature.

The indicating instrument is provided with an indicating hand or member 31, the pointer portion of which extends above the dial which is secured to the flange or rim of the cup-shaped housing, the pointer having two right angled bends therein adjacent the narrow strip 32 to permit the pointer portion to extend above the dial. The indicating member 31 extends a short distance underneath the dial and it is provided adjacent the end thereof with a right angle portion 33 having therein an aperture 34. The indicating member 31 is pivotally mounted by means of the aperture 34 in the right angle portion 33 by having one side of the aperture 34 engaging the hook 29 of the bimetallic actuating member 19 and having the other side of the aperture 34 engaging the hook portion 36 of a spring supporting member 37. The indicating hand 31 therefore is pivotally supported by two knife edge supports.

The spring support member 37 is connected by a suitable rivet or suitable fastening means to an upstanding portion 38 of a pivotally mounted arm 39. The pivotally mounted arm 39 is provided with an aperture through which there extends a pivot stud or fastening means 41 which pivotally and frictionally secures the arm 39 to the bottom of the housing 11. Adjacent the outer end of the arm 39 there is provided a gear sector 42 positioned adjacent an aperture 43 in the base of the housing 11 so that by means of a geared tool the arm 39 may be moved to a particular position during the initial adjustment of the instrument.

Referring to Figure 3 there is shown an electrical circuit in which an instrument of the type shown and described in connection with Figures 1 and 2 may be used. This circuit includes, as diagrammatically shown in Figure 3, an indicating instrument having a spring support member 37, an indicating hand 31, a bimetallic actuating member 17 and a heating element 22 therefor, these parts desirably being constructed as shown in Figures 1 and 2. Where the instrument is to be used to show the condition of an electrical circuit, the heating element 22 is connected at one terminal thereof to a suitable source of electric potential 44 which in turn is connected to ground. The other terminal of the electrical heating unit is connected to a terminal A which in turn is connected to the other side of the electrical system or to ground. If the terminal A is connected to ground or to the other side of the circuit, the indicating instrument operates to show the voltage condition of the power source 44. Since the ambient temperature compensated actuating member 19 will be heated to different values depending upon the voltage of source 44 and the ambient temperature of the instrument may vary over a relatively wide range, there must be provided some means for compensating for this difference in the rate of heat loss. This is accomplished by using the bimetallic portion 28 in the arrangement shown in Figure 1 or by any of the other arrangements subsequently to be described.

Where the electrical instrument is to be used to indicate a variable factor, as in a liquid level gauge, the terminal A is connected to a terminal B which, in turn is connected to an electrical heating element 45 which surrounds a bimetallic leg of a transmitter unit 46. The transmitter unit 46 is desirably of the same construction as the receiver unit, comprising a V-shaped bimetallic element having the parts 18, 19, 21 and 28, the spring 37, and a loop 33 connecting 28 and 37. Adjacent the free end of the bimetallic element there is an electrical contact 47 which cooperates with a mechanically movable electric contact 48 which in turn is connected to ground. If for example, the variable factor to be indicated is the level of a liquid, there will be provided a suitable float 49 connected to actuate a cam 51 which operates against a cam follower 52 so as to move the contact 48 to a position corresponding to the level of the liquid. Transmitting instruments of the type suitable for use in the circuit of this type may be any of the instruments shown in United States Letters Patent No. 2,006,608, granted July 2, 1935 upon the application of T. J. Smulski; Reissue No. 21,527, granted August 6, 1940 upon the application of T. J. Smulski; or Patent No. 2,133,077, granted October 11, 1938 upon the application of Leonard Boddy. Such transmitting instruments are utilized in an electrical indicating system in which a variable factor is indicated at a remote point from the transmitting unit by the transmission of a series of current pulsations. Such systems are known in the art and are illustrated by United States Letters Patent No. 1,885,048, granted October 25, 1932 upon the application of F. M. Slough.

The operation of the electrical circuit shown in Figure 3 may be briefly described by stating that it will be assumed that the liquid level causes the adjustable contact 48 to be moved to a particular position. Electrical energy flowing through the circuit from the source 44 produces heating of the transmitter leg of the ambient temperature compensated bimetallic element 46 by means of the electrical heating element 45 thereof so that the bimetallic element is warped thus tending to move the electrical contact 47 away from the contact 48 thereby to break the circuit. If the circuit is broken the bimetallic element 46 begins to cool so that contact is again established between the contacts 47 and 48 and by repetition of this action additional current impulses are caused to be transmitted to the indicating unit. This making and breaking of the contacts occurs at a relatively rapid rate and the impulses of power thus transmitted serve to provide heating of the receiver leg 19 of the bimetallic actuating member 17 by means of the heating element 22 so that the bimetallic element 17 will cause the indicator 31 to assume a position such that it indicates the condition of the variable factor at the transmitting unit. If it is assumed that the indicating instrument used in connection with Figure 3 is of the type shown in Figures 1 and 2, it will be readily apparent to those skilled in the art that current flowing through the heating element 22 will heat the pointer actuating leg 19 of the bimetallic actuating member 17 so as to cause this member to move in such direction as to move the indicating pointer 31 to a particular position on the dial. Where the ambient temperatures at both the sender and receiver are the same, the heat losses are the same and accurate indication will be obtained. If the ambient temperature at the receiver is higher than that at the transmitter and the amounts of electrical energy converted to heat at the receiver and the transmitter are the same, there will be a greater heat loss at the receiver, thus producing inaccurate indication. At the higher ambient temperature the rate of heat loss will be considerably greater than at the lower temperature and hence the heating effect produced by the current flowing through the heating element 22 will not produce as great movement of the indicating pointer for a given change of the condition to be indicated as would be the case at a lower ambient temperature of the receiver. Since the indicating pointer 31 is supported by a knife edge mounting which includes a mounting spring 37, any action of the leg 19 is one which is opposed to a certain degree by the bias exerted by the spring mounting 37. At the time that the instrument is initially calibrated the bias exerted by the mounting member 37 is controlled by adjustment of the position of the leg or arm 39 as determined by the operator by means of a gear tool inserted in the aperture 43 which engages the gear sector 42. In the arrangement shown in Figure 1, the bimetallic member 28 is positioned in a generally transverse direction to the direction of the bimetallic leg 19, so that the high ambient temperatures will cause this portion 28 to move at substantially right angles to the movement of the leg 19 and in a direction toward the mounting spring 37 thereby in effect reducing the amount of bias against which the actuating leg 19 will operate. This reduction of the bias exerted by the spring 37 at high ambient temperatures permits the mechanical force of the heated bimetallic leg 19 to produce a slightly greater movement of the indicating hand 31 thereby to produce substantially the same extent of movement of the pointer for a given change of the factor to be indicated, regardless of the ambient temperature of the receiver.

While, in the arrangements shown in Figures 1 and 2, the mechanical bias of the spring member 37 has been reduced by a bimetallic portion 28 located adjacent the free end of the bimetallic member 19, it is possible to produce a similar reduction of the mechanical bias by other arrangements.

Thus, for example, in Figure 4 there is again shown an indicating instrument having a housing 11a provided with a pivoted arm 12a secured by a stud 13a so that the arm 12a may be adjusted by means of a gear sector 14a positioned adjacent an aperture 15a in the bottom of the enclosure 11a. The supporting enclosure 11a is also provided with another arm 39a which is provided with a gear sector 42a positioned adjacent an aperture 43a in the bottom of the supporting frame. The arm 39a is provided with an upstanding portion 38a which in turn supports the spring support member 37a. The arm 12a is provided with an upstanding portion 16a which in the present instance is at substantially right angles to the portion 16 of the corresponding arm 12 in Figure 1. Mounted on the portion 16a of Figure 4 there is a bimetallic actuating member which has a bimetallic portion 53, an ambient temperature compensated leg 54, a connecting portion 55 and an actuating leg 56 which is provided with a suitable heating element. The end of the actuating leg 56 is provided directly with a hook portion which in turn engages a suitable indicating pointer in a manner similar to that shown in Figure 2. In the present arrangement the ambient temperature increase produces a warping of the bimetallic portion 53 so as to reduce the amount of mechanical bias exerted upon the actuating leg 56 and at the same time there is introduced by virtue of its position by the bimetallic member 53, a correction factor which changes the effective pivot of the actuating hand of the indicating hand 31. This occurs because the bimetallic portion 53 is positioned at the end of the ambient temperature compensating leg 54. Thus this bimetallic portion 53 produces in effect a sort of rotation of the entire bimetallic actuating assembly comprising the ambient temperature compensating leg 54 and the interconnecting portion 55 into actuating member 56. It is believed that from this description no further explanation of the operation is necessary as this will be readily understood by those skilled in the art.

Instead of having a bimetallic portion such as 53 in Figure 4 which simultaneously reduces the mechanical bias and shifts the pivot of the indicating hand, there may be provided a separate bimetallic element as is shown in Figure 5. Thus in Figure 5 there is provided a housing 11b having therein a pivoted member 12b provided with an upstanding portion 16b which in turn supports a bimetallic member 57 to the outer end of which there is connected by suitable means a bimetallic actuating assembly comprising the compensating leg 58, the interconnecting portion 59 and the heated leg 61. A second pivoted member 39b is provided with an upstanding portion 38b which in turn supports the spring supporting member 37b. The indicating hand is connected by a hooked end portion of the bimetallic leg 61 and a hooked end portion of the spring supporting member 37b. By virtue of the fact that the bimetallic member 57 is positioned on the other side of the bimetallic actuating assembly, the assembly will move in a direction opposite to the movement of portion 53 of Figure 4, the bimetallic member 57 tending to move toward the center of the housing 11b with increase of ambient temperature. This produces a rotation of the bimetallic members 58, 59, and 61, thus changing the effective pivot of the indicating hand and also changing the mechanical bias which is exerted by the spring member 37b.

If desired, compensation for changes of heat losses with change of ambient temperature may be introduced by such arrangements as are shown in Figures 6 and 7. For example, in Figure 6 there is shown an arm 39c which is provided with an upstanding portion 38c which in turn supports a spring member 37c having secured to the outer end thereof a bimetallic member 62 which has at its free end a hook portion 63 for engagement with the apertured portion of the indicating hand. In such arrangement the bimetallic member 62 at increased ambient temperatures will warp toward the center of the instrument thereby reducing the mechanical bias against which the bimetallic actuating member must operate without any substantial change in the effective pivot of the indicating hand.

Another way of accomplishing substantially the same result as was done by the arrangement shown in Figure 6 may be by the means shown in Figure 7. Figure 7 therefore shows an arm 39d provided with an upstanding portion 38d which in turn supports a spring support member 37d. Mounted adjacent to a portion of the spring member 37d is a bimetallic portion 64 which is so positioned that at the high ambient temperatures the bimetallic portions 64 will warp toward the center of the instrument housing thereby to relieve or reduce the mechanical bias which may be exerted by the spring arm 37d upon the indicating hand without any effective change in the pivot thereof.

While for the purposes of explanation of my invention there have been shown certain specific embodiments, it is to be understood that I am not to be limited thereto since obviously modifications may be made in the instrumentalities employed without departing from the spirit and scope of my invention as set forth in the appended claims.

I claim:
1. An electrical instrument having a bimetallic member for actuating an indicator provided with a connecting part, said member having a first portion provided with an electric heating element adapted to be energized in accordance with the condition to be indicated, a connecting part provided on said first portion, a second portion operatively connected with the first portion for effecting compensation for fluctuation of the first portion caused by variations of ambient temperature, and additional bimetallic means provided with a connecting part, said connecting parts on said member and on said additional bimetallic means being directly connected to the connecting part of said indicator, and one of said parts being arranged to increase in response to ambient temperature rise, the extent of movement of the indicator produced by said first portion in response to a given rise of temperature of the first portion above the ambient temperature thereby to compensate for the increase in heat loss of said heated portion at higher ambient temperatures.

2. An electrical instrument having means for actuating an indicator provided with an opening, said means including a first portion of bimetallic material provided with an electric heating element adapted to be energized in accordance with the condition to be indicated, a connecting part provided on said first portion disposed in said opening for connecting said first portion to said indicator, a second portion of bimetallic material operatively connected with the first portion for effecting compensation for displacement of the first portion caused by variations of ambient temperature, and a third portion of bimetallic material provided with means disposed in said opening for directly connecting said third portion to said indicator, said third portion being arranged to increase in response to ambient temperature rise, the extent of movement of the indicator produced by said first portion in response to a given rise of temperature of the first portion above the ambient temperature thereby to compensate for the increase in heat loss of said heated portion at higher ambient temperatures.

3. Indicator means comprising a pointer provided with attachment means, a pair of bimetallic members directly connected to said attachment means of said pointer providing the sole means for fulcruming said pointer for pivotal movement with respect to said bimetallic members.

4. Indicator means comprising a pointer, and a pair of heat responsive means directly engageable with said pointer to provide fulcrums therefore and constructed and arranged for influencing the movement of the pointer.

5. Indicator means comprising a pointer provided with an opening, a pair of bimetallic portions received in said opening in a manner whereby said portions may be influenced to control the operation of said pointer.

6. Indicator means comprising a pointer having a pair of abutment means thereon, and a pair of bimetallic portions engaging said abutment means for fulcruming the pointer and assisting to maintain said pointer in a predetermined position so that said portions may be influenced to control the pivotal operation of said pointer.

7. An electrical indicating instrument comprising, in combination, bimetallic means which includes an actuating portion and an ambient temperature compensating portion, electrical heating means for the actuating portion, an indicating member actuated by said bimetallic actuating portion, means for applying a mechanical bias to control the movement of said indicating member, and bimetallic means operatively connected with said bias means for influencing the operation of said indicating member and being responsive to ambient temperature to vary the bias as said ambient temperature increases.

8. Indicator means comprising a pointer, a pair of heat responsive means directly engageable with said pointer to provide fulcrums therefore and constructed and arranged for influencing the pivotal movement of the pointer, and yieldable means supporting one of said heat responsive means.

9. An indicating instrument comprising a member adapted to be heated, an ambient temperature compensating member operatively connected with said member adapted to be heated, an indicating member adapted to be actuated by the member adapted to be heated, biasing means actuable on said indicating member, and heat responsive means operatively connected with said biasing means and responsive to ambient temperature to vary the bias as the ambient temperature changes.

10. An indicating instrument comprising heat responsive means which includes an actuating portion and an ambient temperature compensating portion, means for heating one of said portions, an indicating member actuable by said heat responsive means, means for applying a bias to assist in controlling the movement of said indicating member, and additional heat responsive means operatively connected with said biasing means and responsive to ambient temperature to vary the bias as the ambient temperature changes.

11. An indicating instrument comprising heat responsive means which includes an actuating portion and an ambient temperature compensating portion, means whereby one of said portions may be heated, an indicating member actuable by said actuating portion, means for applying a bias to assist in controlling the movement of said indicating member, and additional heat responsive means operatively connected with said biasing means to vary the bias as the ambient temperature changes.

THEODORE J. SMULSKI.

REFERENCES CITED

The following references are of record in the file of this patent:

UNITED STATES PATENTS

| Number | Name | Date |
| --- | --- | --- |
| Re. 21,527 | Smulski | Aug. 6, 1940 |
| 1,885,052 | Smulski | Oct. 25, 1932 |
| 2,004,421 | Smulski | June 11, 1935 |
| 2,006,608 | Smulski | July 2, 1935 |
| 2,022,441 | Smulski | Nov. 26, 1935 |
| 2,107,560 | Boddy | Feb. 8, 1938 |
| 2,133,077 | Boddy | Oct. 11, 1938 |
| 2,211,773 | Hall | Aug. 20, 1940 |
| 2,213,339 | Downing | Sept. 3, 1940 |
| 2,353,155 | Hall | July 11, 1944 |